US012410286B2

(12) United States Patent
Lee et al.

(10) Patent No.: US 12,410,286 B2
(45) Date of Patent: Sep. 9, 2025

(54) METHOD FOR PREPARATION OF SUPER ABSORBENT POLYMER

(71) Applicant: LG Chem, Ltd., Seoul (KR)

(72) Inventors: Junwye Lee, Daejeon (KR); Tae Young Won, Daejeon (KR); Jungmin Sohn, Daejeon (KR); Hyemin Lee, Daejeon (KR); Kwangin Shin, Daejeon (KR); Minsu Kim, Daejeon (KR); Chang Hun Han, Daejeon (KR)

(73) Assignee: LG Chem, Ltd., Seoul (KR)

( * ) Notice: Subject to any disclaimer, the term of this patent is extended or adjusted under 35 U.S.C. 154(b) by 815 days.

(21) Appl. No.: 17/598,609

(22) PCT Filed: Sep. 8, 2020

(86) PCT No.: PCT/KR2020/012102
§ 371 (c)(1),
(2) Date: Sep. 27, 2021

(87) PCT Pub. No.: WO2021/066340
PCT Pub. Date: Apr. 8, 2021

(65) Prior Publication Data
US 2022/0145018 A1 May 12, 2022

(30) Foreign Application Priority Data
Sep. 30, 2019 (KR) .................. 10-2019-0121050
Sep. 7, 2020 (KR) .................. 10-2020-0113937

(51) Int. Cl.
*C08J 3/24* (2006.01)
*C08F 20/06* (2006.01)
*C08J 3/12* (2006.01)

(52) U.S. Cl.
CPC .............. *C08J 3/24* (2013.01); *C08F 20/06* (2013.01); *C08J 3/12* (2013.01); *C08J 2333/08* (2013.01)

(58) Field of Classification Search
None
See application file for complete search history.

(56) References Cited

U.S. PATENT DOCUMENTS

| 4,826,880 | A | 5/1989 | Lesniak et al. |
| 4,883,478 | A | 11/1989 | Lerailler et al. |
| 5,976,696 | A | 11/1999 | Collette et al. |
| 6,323,252 | B1 | 11/2001 | Gartner et al. |
| 6,414,214 | B1 * | 7/2002 | Engelhardt .............. C08J 3/245 604/372 |
| 6,964,998 | B2 | 11/2005 | Wada et al. |
| 2004/0019342 | A1 | 1/2004 | Nagasuna et al. |
| 2004/0071966 | A1 | 4/2004 | Inger et al. |
| 2006/0160011 | A1 | 7/2006 | Inoue et al. |
| 2006/0173097 | A1 | 8/2006 | Ahmed et al. |
| 2008/0032888 | A1 | 2/2008 | Nakamura et al. |
| 2008/0075937 | A1 | 3/2008 | Wada et al. |
| 2010/0062252 | A1 | 3/2010 | Kimura et al. |
| 2012/0010372 | A1 | 1/2012 | Fujino et al. |
| 2015/0045461 | A1 | 2/2015 | Funamizu et al. |
| 2015/0093575 | A1 | 4/2015 | Naumann et al. |
| 2016/0208035 | A1 * | 7/2016 | Ryu ..................... C08F 220/06 |
| 2016/0214082 | A1 | 7/2016 | Lee et al. |
| 2016/0339141 | A1 * | 11/2016 | Gann ....................... A61K 8/22 |
| 2019/0134603 | A1 | 5/2019 | Kim et al. |
| 2019/0194367 | A1 | 6/2019 | Lee et al. |

FOREIGN PATENT DOCUMENTS

| CN | 1797222 | A |  | 7/2006 |  |
| CN | 1856331 | A | * | 11/2006 | ............. A61L 15/60 |
| CN | 101781383 | A |  | 7/2010 |  |
| CN | 105612187 | A |  | 5/2016 |  |
| EP | 0309187 | A2 |  | 3/1989 |  |
| EP | 2395029 | A1 |  | 12/2011 |  |
| EP | 3056268 | A1 |  | 8/2016 |  |
| JP | H06298841 | A |  | 10/1994 |  |
| JP | H09124879 | A |  | 5/1997 |  |
| JP | 3103754 | B2 |  | 10/2000 |  |
| JP | 2001523287 | A |  | 11/2001 |  |
| JP | 3461860 | B2 |  | 10/2003 |  |
| JP | 2003529647 | A |  | 10/2003 |  |
| JP | 2004001355 | A |  | 1/2004 |  |
| JP | 2005344103 | A |  | 12/2005 |  |
| JP | 2006297373 | A |  | 11/2006 |  |
| JP | 2007510804 | A |  | 4/2007 |  |
| JP | 4271736 | B2 |  | 6/2009 |  |
| JP | 2013198862 | A |  | 10/2013 |  |
| KR | 970061926 | A |  | 9/1997 |  |
| KR | 20010020403 | A |  | 3/2001 |  |
| KR | 20060033674 | A |  | 4/2006 |  |
| KR | 20070083761 | A |  | 8/2007 |  |
| KR | 20100040247 | A |  | 4/2010 |  |

(Continued)

OTHER PUBLICATIONS

CN 1856331 A English translation (Year: 2006).*
International Search Report for Application No. PCT/KR2020/012102 mailed Dec. 28, 2020, pp. 1-3.
Odian, G., "Principles of Polymerization" Oct. 1981, p. 203, Wiley Interscience Publication.
Schwalm, R., "UV Coatings Basics, Recent Developments and New Application," Dec. 2006, p. 115, Elsevier Science.
Third Party Observation for PCT/KR2020/012102 submitted Jan. 28, 2022. 15 pgs.
Handbook of Chemistry: Pure Chemistry, 3th edition, Section 12, pp. 451-463 (1984).
Medvedev, " Physical Chemistry and Colloid Chemistry" 1st Ed, Higher Education Press, Apr. 1956, pp. 1-8.
Buchholz, F. L. et al., "Modern Superabsorbent Polymer Technology," Copyright © by John Wiley & Sons, Inc., pp. 69-117, retrieved Mar. 1, 2022.

(Continued)

*Primary Examiner* — Jeffrey D Washville
(74) *Attorney, Agent, or Firm* — Lerner David LLP

(57) ABSTRACT

According to the method for preparation of a super absorbent polymer according to the present disclosure, fine particles present in the prepared super absorbent polymer are removed, thereby solving a dispersion problem of the fine particles and a problem of reduction in the physical properties of the super absorbent polymer.

5 Claims, No Drawings

(56) References Cited

FOREIGN PATENT DOCUMENTS

| KR | 101655104 B1 | 9/2016 |
|----|--------------|--------|
| KR | 20180071852 A | 6/2018 |
| KR | 20190012811 A | 2/2019 |
| RU | 2471556 C1 | 1/2013 |
| WO | 1987003208 A1 | 6/1987 |
| WO | 2005108472 A1 | 11/2005 |
| WO | 2006088115 A1 | 8/2006 |
| WO | 2014021388 A1 | 2/2014 |
| WO | 2015053372 A1 | 4/2015 |

OTHER PUBLICATIONS

Communication pursuant to Article 94(3) EPC for Application No. EP 20872956.6 dated Feb. 13, 2023, pp. 1-9.
Database WPI Week 199502 Thomson Scientific, London, GB; AN 1995-011861, 2 pages.
Feather, Y., JAIMA Season 2013 Summer, Toa DKK Co., Ltd., Published Aug. 13, 2013, pp. 6-8 <https://www.jaima.or.jp/jp/analytical/basic/electrochem/ec/> [Partial translation is attached].
Matsumoto, T. "Experimental report" dated Nov. 24-25, 2021, Nippon Shokubai Co., Ltd. , 1 page.
Third Party Observation for Application No. EP 20872956.6 dated Jan. 2, 2023, pp. 1-7.
Database WPI, Week 199729, Oct. 30, 2000 (Oct. 30, 2000), 2 pages, Thomson Scientific, London, GB; AN 1997-316703. XP002806247.
Extended European Search Report including Written Opinion for Application No. 20872956.6 dated May 2, 2022, pp. 1-17.

\* cited by examiner

METHOD FOR PREPARATION OF SUPER ABSORBENT POLYMER

CROSS-REFERENCE TO RELATED APPLICATIONS

The present application is a national phase entry under 35 U.S.C. § 371 of International Application No. PCT/KR2020/012102, filed on Sep. 8, 2020, which claims priority to Korean Patent Application No. 10-2019-0121050, filed on Sep. 30, 2019, and Korean Patent Application No. 10-2020-0113937, filed on Sep. 7, 2020, the disclosures of which are incorporated herein by reference in their entirety.

BACKGROUND OF THE INVENTION

(a) Field of the Invention

The present disclosure relates to a method for preparation of a super absorbent polymer, which can solve a dispersion problem of fine particles and a problem of reduction in physical properties of the super absorbent polymer.

(b) Description of the Related Art

A super absorbent polymer (SAP) is a type of synthetic polymeric material capable of absorbing 500 to 1000 times its own weight of moisture. Various manufacturers have denominated it with different names, such as SAM (Super Absorbency Material), AGM (Absorbent Gel Material), and the like. Such super absorbent polymers started to be practically applied in sanitary products, and they are now being widely used not only for hygiene products such as disposable diapers for children, etc., but also for water retaining soil products for gardening, water stop materials for the civil engineering and construction, sheets for raising seedling, fresh-keeping agents for food distribution fields, materials for poultices, or the like.

In most cases, these super absorbent polymers have been widely used in the field of hygienic materials such as diapers or sanitary napkins. In such hygienic materials, the super absorbent polymer is generally contained in a state of being spread in the pulp. In recent years, however, continuous efforts have been made to provide hygienic materials such as diapers having a thinner thickness. As a part of such efforts, the development of so-called pulpless diapers and the like in which the pulp content is reduced or pulp is not used at all is being actively advanced.

Meanwhile, the super absorbent polymer is generally prepared in the form of particles having a particle diameter of 150 to 850 um, and optimum physical properties of the super absorbent polymer are achieved within the above particle diameter range. In order to prepare a super absorbent polymer having such a particle diameter, pulverization and classification steps are inevitably included in the preparation of the super absorbent polymer.

However, despite the pulverization and classification processes as described above, particles having a particle diameter of less than 150 um are contained in the super absorbent polymer to be prepared to some extent due to characteristics of the pulverulent body. Accordingly, a dispersion problem of the above-described particles occurs in the preparation process, which causes a problem in the process environment and various problems in the process such as an air filtering device for removing them in the process. In addition, the above-described particles are also contained in the product of the super absorbent polymer, and when the super absorbent polymer absorbs moisture, the particles agglomerate, resulting in a phenomenon that inherent physical properties of the super absorbent polymer are impaired.

To this end, a method of removing fine particles by spraying moisture on the prepared super absorbent polymer has been conventionally used. When removing the fine particles by dispersing moisture, it is somewhat effective in removing fine particles. However, in that process, there is a problem in that fine particles agglomerate together and remain in the super absorbent polymer, which is a factor in deteriorating various physical properties of the super absorbent polymer.

SUMMARY OF THE INVENTION

Technical Problem

Under the above background, there is provided a method of removing fine particles present in the super absorbent polymer to be prepared using brine in order to solve the dispersion problem of fine particles and the problem of reduction in physical properties of the super absorbent polymer.

Technical Solution

In order to solve the above problems, there is provided a method for preparation of a super absorbent polymer including:
  forming a hydrogel polymer containing a first cross-linked polymer by cross-linking polymerization of a water-soluble ethylene-based unsaturated monomer having at least partially neutralized acidic groups in the presence of an internal cross-linking agent (Step 1);
  drying, pulverizing and classifying the hydrogel polymer to form a base resin powder (Step 2); and
  cross-linking a surface by heat-treating the base resin powder in the presence of a surface cross-linking solution to form super absorbent polymer particles (Step 3); and
  adding brine to the super absorbent polymer particles (Step 4),
  wherein a conductivity of the brine is 15 to 55 mS/cm.

Hereinafter, the present disclosure will be described in detail for each step.

(Step 1)

The above Step 1 is to form a hydrogel polymer containing a first cross-linked polymer by cross-linking polymerization of a water-soluble ethylene-based unsaturated monomer having at least partially neutralized acidic groups in the presence of an internal cross-linking agent.

The water-soluble ethylene-based unsaturated monomer constituting the first cross-linked polymer may be any monomer commonly used in the preparation of a super absorbent polymer. As a non-limiting example, the water-soluble ethylene-based unsaturated monomer may be a compound represented by the following Chemical Formula 1:

$$R_1-COOM_1 \qquad \text{[Chemical Formula 1]}$$

in Chemical Formula 1,
$R_1$ is a C2 to C5 alkyl group having an unsaturated bond, and
$M_1$ is a hydrogen atom, a monovalent or divalent metal, an ammonium group, or an organic amine salt.

Preferably, the monomer may be at least one selected from the group consisting of acrylic acid, methacrylic acid, and a monovalent metal salt, a divalent metal salt, an ammonium salt and an organic amine salt of the acid. When acrylic acid or a salt thereof is used as the water-soluble ethylene-based unsaturated monomer, it is advantageous to obtain a super absorbent polymer having improved absorption performance. In addition, maleic anhydride, fumaric acid, crotonic acid, itaconic acid, 2-acryloylethane sulfonic acid, 2-methacryloylethanesulfonic acid, 2-(meth)acryloylpropanesulfonic acid, 2-(meth)acrylamide-2-methyl propane sulfonic acid, (meth)acrylamide, N-substituted (meth) acrylate, 2-hydroxyethyl (meth)acrylate, 2-hydroxypropyl (meth)acrylate, methoxypolyethylene glycol (meth)acrylate, polyethylene glycol (meth)acrylate, (N,N)-dimethylaminoethyl (meth)acrylate, (N,N)-dimethylaminopropyl (meth) acrylamide, or the like may be used as the monomer.

Herein, the water-soluble ethylene-based unsaturated monomer has acidic groups, and at least some of the acidic groups may be neutralized. Preferably, the monomer partially neutralized with an alkaline substance such as sodium hydroxide, potassium hydroxide, ammonium hydroxide, or the like may be used.

Herein, a degree of neutralization of the monomer may be 40 to 95 mol %, 40 to 80 mol %, or 45 to 75 mol %. A range of the degree of neutralization may vary depending on the final physical properties. An excessively high degree of neutralization causes the neutralized monomers to be precipitated, and thus polymerization may not readily occur. On the contrary, an excessively low degree of neutralization not only deteriorates absorbency of the polymer, but also gives the polymer hard-to-handle properties, such as those of an elastic rubber.

In addition, the concentration of the water-soluble ethylene-based unsaturated monomer in the monomer composition may be appropriately adjusted in consideration of polymerization time and reaction conditions, and may preferably be 20 to 90 wt %, or 40 to 65 wt %. This concentration range may be advantageous in order to control the pulverization efficiency during pulverization of the polymer, which will be described later, while avoiding the need to remove unreacted monomers after polymerization by using a gel effect phenomenon occurring in the polymerization reaction of a high-concentration aqueous solution. However, if the concentration of the monomer is excessively low, the yield of the super absorbent polymer may become low. On the contrary, if the concentration of the monomer is excessively high, there is a process problem that a part of the monomers is precipitated, or pulverization efficiency is lowered upon pulverization of the polymerized hydrogel polymer, and physical properties of the super absorbent polymer may be deteriorated.

In addition, the monomer composition may include a foaming agent, if necessary. The foaming agent functions to increase the surface area by foaming during polymerization to form pores in the hydrogel polymer. The foaming agent may be an inorganic foaming agent or an organic foaming agent. Examples of the inorganic foaming agent include sodium bicarbonate, sodium carbonate, potassium bicarbonate, potassium carbonate, calcium carbonate, calcium bicarbonate, magnesium bicarbonate and magnesium carbonate. Examples of the organic foaming agent include 2,2'-azobis (2-methylpropionamidine) dihydrochloride (AAPH), azodicarbonamide (ADCA), dinitroso pentamethylene tetramine (DPT), p,p'-oxybisbenzenesulfonylhydrazide (OBSH), and p-toluenesulfonyl hydrazide (TSH).

In addition, the foaming agent may preferably be used in an amount of 1.0 wt % or less based on the weight of the water-soluble ethylene-based unsaturated monomer. If the amount of the foaming agent exceeds 1.0 wt %, pores are formed too much, so that gel strength and density of the super absorbent polymer decrease, which may cause problems in distribution and storage. In addition, the foaming agent may preferably be used in an amount of 0.01 wt % or more based on the weight of the water-soluble ethylene-based unsaturated monomer.

As the internal cross-linking agent, any compound may be used as long as it allows the introduction of cross-linking bonds during polymerization of the water-soluble ethylene-based unsaturated monomer. As a non-limiting example, the internal cross-linking agent may be a multifunctional cross-linking agent such as N,N'-methylenebisacrylamide, trimethylolpropane tri(meth)acrylate, ethylene glycol di(meth) acrylate, polyethylene glycol (meth)acrylate, propylene glycol di(meth)acrylate, polypropylene glycol (meth)acrylate, butanediol di(meth)acrylate, butylene glycol di(meth) acrylate, diethylene glycol di(meth)acrylate, hexanediol di(meth)acrylate, triethylene glycol di(meth)acrylate, tripropylene glycol di(meth)acrylate, tetraethylene glycol di(meth)acrylate, dipentaerythritol pentaacrylate, glycerin tri (meth)acrylate, pentaerythritol tetraacrylate, triarylamine, ethylene glycol diglycidyl ether, propylene glycol, glycerin, or ethylene carbonate, polyethylene glycol di(meth)acrylate, polypropylene glycol di(meth)acrylate, and these may be used alone or in combination of two or more. However, the present disclosure is not limited thereto. Preferably, two types of polyethylene glycol diacrylates having different molecular weights are used.

This internal cross-linking agent may be added in a concentration of about 0.001 to 1 wt % based on the monomer composition. That is, if the concentration of the internal cross-linking agent is too low, absorption rate of the resin may be lowered and gel strength may be weakened, which is not preferable. Conversely, if the concentration of the internal cross-linking agent is too high, absorbency of the resin may be lowered, making it undesirable as an absorber.

In addition, in Step 1, a thermal polymerization initiator, a photopolymerization initiator, or an oxidation-reduction (redox) initiator generally used in the preparation of a super absorbent polymer may be included.

As the thermal polymerization initiator, one or more compounds selected from the group consisting of a persulfate-based initiator, an azo-based initiator, hydrogen peroxide, and ascorbic acid may be used. Specifically, examples of the persulfate-based initiator may include sodium persulfate ($Na_2S_2O_8$), potassium persulfate ($K_2S_2O_8$), ammonium persulfate (($NH_4$)$_2S_2O_8$) and the like. In addition, examples of the azo-based initiator may include 2,2-azobis(2-amidinopropane) dihydrochloride, 2,2-azobis-(N,N-dimethylene) isobutyramidine dihydrochloride, 2-(carbamoylazo)isobutylonitril, 2,2-azobis[2-(2-imidazolin-2-yl)propane] dihydrochloride, 4,4-azobis-(4-cyanovaleric acid), and the like. More various thermal polymerization initiators are well disclosed in "Principle of Polymerization (Wiley, 1981)" written by Odian, p 203, which may be referred to.

For example, the photopolymerization initiator may be one or more compounds selected from the group consisting of benzoin ether, dialkyl acetophenone, hydroxyl alkylketone, phenyl glyoxylate, benzyl dimethyl ketal, acyl phosphine and α-aminoketone. Further, as the specific example of acyl phosphine, commercial Lucirin TPO, namely, 2,4, 6-trimethyl-benzoyl-trimethyl phosphine oxide, may be used. More various photopolymerization initiators are well disclosed in "UV Coatings: Basics, Recent Developments and New Application (Elsevier, 2007)" written by Reinhold Schwalm, p 115, which may be referred to.

Further, a reducing agent that accelerates decomposition of the polymerization initiator described above can be used in combination therewith, and the combination may be used as an oxidation-reduction (redox) initiator. As the reducing agent, sulfites such as sodium sulfite or sodium hydrogen sulfite, reducing metals such as ferrous salts, L-ascorbic acid, and amines may be used alone or in combination of two or more, but the present disclosure is not limited thereto.

This polymerization initiator may be added in a concentration of about 0.001 to 1 wt % based on the monomer composition. That is, if the concentration of the polymerization initiator is too low, the polymerization rate may become slow, and a large amount of residual monomers may be extracted from the final product, which is not preferable. On the contrary, if the concentration of the polymerization initiator is higher than the above range, polymer chains forming a network are shortened, so that the content of extractable components increases and absorbency under pressure decreases, thereby lowering physical properties of the polymer.

In addition, the monomer composition may further include an additive such as a thickener, a plasticizer, a preservation stabilizer, an antioxidant, and the like, if necessary.

In addition, the monomer composition may be prepared in the form of a solution in which raw materials such as the above-described monomers are dissolved in a solvent. At this time, any solvent which can dissolve the raw materials may be used without limitation, and for example, water, ethanol, ethyleneglycol, diethyleneglycol, triethyleneglycol, 1,4-butanediol, propyleneglycol, ethyleneglycol monobutylether, propyleneglycol monomethylether, propyleneglycol monomethylether acetate, methylethylketone, acetone, methylamylketone, cyclohexanone, cyclopentanone, diethyleneglycol monomethylether, diethyleneglycol ethylether, toluene, xylene, butyrolactone, carbitol, methylcellosolve acetate, N,N-dimethylacetamide, and a mixture thereof may be used.

Herein, the thermal polymerization or UV polymerization of the monomer composition is not particularly limited, and a conventional method may be used. Specifically, the thermal polymerization may be divided into a redox polymerization method in which polymerization is performed for 2 minutes to 30 minutes at a temperature of 30 to 100° C., and thermal polymerization in which polymerization is performed for 2 minutes to 30 minutes. In addition, UV polymerization (photopolymerization) may be performed by irradiating light for 10 seconds to 5 minutes at a temperature of 30 to 90° C. In addition, the amount of ultraviolet light during UV irradiation may be 0.1 to 30 mW/cm$^2$. A light source and a wavelength range used for UV irradiation may also be well known in the art.

For example, the monomer composition may be added to a reactor such as a kneader equipped with an agitation spindle, and then hot air may be supplied thereto or the reactor may be heated to perform thermal polymerization to obtain a hydrogel polymer. At this time, the hydrogel polymer discharged to a reactor outlet may be in the form of particles of several millimeters to several centimeters depending on a shape of the agitation spindle provided in the reactor. Specifically, the hydrogel polymer may be obtained in various forms depending on the concentration and injection rate of the monomer composition to be injected, and a hydrogel polymer having a (weight average) particle diameter of 2 to 50 mm may be obtained. And, as another example, the hydrogel polymer may be formed by a conventional UV initiation method. In this case, the reaction may proceed by adding the monomer composition into a chamber provided with a UV irradiation device and a tray, and then irradiating UV. Specifically, the hydrogel polymer may be obtained in various forms depending on the concentration and injection rate of the monomer composition to be injected, and a hydrogel polymer having a (weight average) particle diameter of 2 to 50 mm may be obtained.

Meanwhile, the moisture content of the hydrogel polymer obtained by the above method may be 40 to 80 wt %. At this time, the "moisture content" in the present disclosure is the content of moisture in the entire weight of the hydrogel polymer, and it means a value of which the weight of the dried polymer is subtracted from the weight of the hydrogel polymer. Specifically, the moisture content is defined as a value calculated from the weight loss due to moisture evaporation from the polymer in the process of increasing the temperature of the polymer and drying the same through infrared heating. At this time, the drying condition for measuring the moisture content is that the temperature is increased to 180° C. and maintained at 180° C., and the total drying time is 20 min including 5 min of a heating step.

(Step 2)

The Step 2 is to form a base resin powder by drying, pulverizing and classifying the hydrogel polymer prepared in Step 1 above. It is appropriate that a base resin powder and a super absorbent polymer obtained therefrom are prepared and provided so as to have a particle diameter of 150 to 850 um. More specifically, at least 95 wt % or more of the base resin powder and the super absorbent polymer obtained therefrom may have a particle diameter of 150 to 850 um, and a fine powder having a particle diameter of less than 150 um may be less than 3 wt %. As the particle diameter distribution of the base resin powder and the super absorbent polymer is adjusted to a preferable range, the finally prepared super absorbent polymer may exhibit the above-described physical properties well.

Meanwhile, the drying, pulverization and classification will be described in more detail as follows.

First, in the drying of the hydrogel polymer, a coarse pulverizing step may be further performed before drying in order to increase the drying efficiency, if necessary. At this time, the pulverizing machine used is not particularly limited. Specifically, it may include at least one selected from the group consisting of a vertical pulverizer, a turbo cutter, a turbo grinder, a rotary cutter mill, a cutter mill, a disc mill, a shred crusher, a crusher, a chopper, and a disc cutter, but it is not limited thereto.

In the coarse pulverizing step, the hydrogel polymer may be pulverized to have a diameter of about 2 mm to about 10 mm. It is technically difficult to pulverize the hydrogel polymer to have a diameter of less than 2 mm because of its high moisture content, and there may be a phenomenon that the pulverized particles cohere with each other. Meanwhile, when the polymer is pulverized to have a diameter of larger than 10 mm, the efficiency enhancing effect in the subsequent drying step may be insufficient.

The hydrogel polymer coarsely pulverized as above or the hydrogel polymer immediately after the polymerization without the coarse pulverizing step is subjected to drying. At this time, the drying temperature of the drying step may be 50 to 250° C. If the drying temperature is lower than 50° C., the drying time may become excessively long and the properties of the super absorbent polymer finally prepared may decrease. And if the drying temperature is higher than 250° C., the surface of the polymer is excessively dried to generate fine powders in a subsequent pulverizing process, and the properties of the super absorbent polymer finally prepared may decrease. The drying process may be preferably performed at a temperature of 150 to 200° C., more preferably at a temperature of 160 to 190° C. Furthermore, the drying time may be 20 minutes to 15 hours in consideration of process efficiency, but it is not limited thereto.

The drying method is not particularly limited if it has been generally used in the drying process of the hydrogel polymer. Specifically, the drying step may be performed by the method of hot air provision, infrared radiation, microwave radiation, UV light irradiation, and the like. The moisture content of the polymer after the drying step may be 0.05 to 10 wt %.

Subsequently, a step of pulverizing the dried polymer obtained through the above drying step is performed. The polymer powder obtained after the pulverizing step may have a particle diameter of 150 to 850 um. The pulverizing machine used to pulverize it to such a particle diameter may be specifically, a ball mill, a pin mill, a hammer mill, a screw mill, a roll mill, a disk mill, or a jog mill, but the present disclosure is not limited thereto.

Further, in order to control the properties of the super absorbent polymer powder which is finally commercialized after the pulverizing step, a separate process of classifying the polymer powder obtained after the pulverization according to the particle diameter may be performed. Preferably, a polymer having a particle diameter of 150 to 850 um is classified, and then only a polymer powder having such a particle diameter can be commercialized through a surface cross-linking reaction step to be described later.

(Step 3)

The Step 3 is to cross-link a surface of the base resin prepared in Step 2, and is a step of cross-linking a surface by heat-treating the base resin powder in the presence of a surface cross-linking solution containing a surface cross-linking agent to form super absorbent polymer particles.

Herein, the kind of the surface cross-linking agent contained in the surface cross-linking solution is not particularly limited. For example, the surface cross-linking agent may be at least one compound selected from the group consisting of ethylene glycol diglycidyl ether, polyethylene glycol diglycidyl ether, glycerol polyglycidyl ether, propylene glycol diglycidyl ether, polypropylene glycol diglycidyl ether, ethylene glycol, diethylene glycol, propylene glycol, triethylene glycol, tetraethylene glycol, propane diol, dipropylene glycol, polypropylene glycol, glycerin, polyglycerin, butanediol, heptanediol, hexanediol, trimethylolpropane, pentaerythritol, sorbitol, calcium hydroxide, magnesium hydroxide, aluminum hydroxide, iron hydroxide, calcium chloride, magnesium chloride, aluminum chloride, and iron chloride.

At this time, the content of the surface cross-linking agent may preferably be 0.01 to 5 parts by weight based on 100 parts by weight of the base resin. If the content of the surface cross-linking agent exceeds 5 parts by weight, excessive surface cross-linking proceeds, and when the super absorbent polymer absorbs water, there is a problem in that a large amount of moisture exists on the surface and thus the degree of drying is lowered.

In addition, the surface cross-linking solution may further contain at least one solvent selected from the group consisting of water, ethanol, ethylene glycol, diethylene glycol, triethylene glycol, 1,4-butanediol, propylene glycol, ethylene glycol monobutyl ether, propylene glycol monomethyl ether, propylene glycol monomethyl ether acetate, methyl ethyl ketone, acetone, methyl amyl ketone, cyclohexanone, cyclopentanone, diethylene glycol monomethyl ether, diethylene glycol ethyl ether, toluene, xylene, butyrolactone, carbitol, methyl cellosolve acetate and N,N-dimethylacetamide. Preferably, it contains water. The solvent may be used in an amount of 0.5 to 10 parts by weight based on 100 parts by weight of the base resin powder.

In addition, the surface cross-linking solution may contain an inorganic filler. The inorganic filler may include silica, aluminum oxide, or silicate. The inorganic filler may be contained in an amount of 0.01 to 0.5 parts by weight based on 100 parts by weight of the base resin powder.

In addition, the surface cross-linking solution may further include a thickener. When the surface of the base resin powder is further cross-linked in the presence of a thickener, deterioration in physical properties may be minimized even after the pulverization. Specifically, the thickener may be one or more selected from polysaccharides and polymers containing hydroxyl groups. More specifically, examples of the polysaccharides include gum-based thickeners and cellulose-based thickeners. Examples of the gum-based thickener include xanthan gum, arabic gum, karaya gum, tragacanth gum, ghatti gum, guar gum, locust bean gum and psyllium seed gum, and examples of the cellulose-based thickener include hydroxypropylmethylcellulose, carboxymethylcellulose, methylcellulose, hydroxymethylcellulose, hydroxyethylcellulose, hydroxypropylcellulose, hydroxyethylmethylcellulose, hydroxymethylpropylcellulose, hydroxyethylhydroxypropylcellulose, ethylhydroxyethylcellulose, and methylhydroxypropylcellulose. Examples of the polymers containing hydroxyl groups include polyethylene glycol and polyvinyl alcohol.

Meanwhile, in order to perform the surface cross-linking, a method of adding the surface cross-linking solution and the base resin in a reactor, followed by mixing, a method of spraying the surface cross-linking solution onto the base resin, or a method of mixing the base resin and the surface cross-linking solution while continuously providing them to a continuously-operating mixer may be used.

In addition, the surface modification step may be performed at a temperature of 100 to 250° C., and preferably at a temperature of 180 to 250° C. The surface modification may be performed for 1 to 120 minutes, preferably for 1 to 100 minutes, more preferably for 10 to 60 minutes. That is, the surface modification step may be performed under the above-described conditions in order to prevent physical properties from deteriorating by reducing the damage of the polymer particles due to excessive reaction, while inducing a minimal surface cross-linking reaction.

(Step 4)

The Step 4 is to add brine to the super absorbent polymer particles prepared above.

In the super absorbent polymer prepared in Step 3 above, fine particles having a particle diameter of 150 um or less inevitably exist due to characteristics of the pulverulent body. During the preparation process or when the super absorbent polymer is used by a consumer as a product, fine particles are dispersed in the air, resulting in process problems or health problems. In addition, in the process of absorbing moisture or the like, the super absorbent polymer has a phenomenon in which fine particles are agglomerated, which is a factor in deteriorating the inherent physical properties of the super absorbent polymer.

Accordingly, the present disclosure further includes a step of removing the fine particles present in the super absorbent polymer by adding a hydrolysis process using brine to the prepared super absorbent polymer particles. Through this, about 50% or more of the fine particles contained in the super absorbent polymer are removed, and thus it is possible to suppress the dispersion problem of fine particles and the phenomenon that physical properties of the super absorbent polymer are impaired.

A conductivity of the brine is 15 to 55 mS/cm. If the conductivity of the brine is less than 15 mS/cm, particles (coarse particles) generated by agglomeration of super absorbent polymers having a relatively large diameter in addition to the fine particles are generated and removed, and there is a fear that physical properties of the super absorbent polymer may be deteriorated. In particular, there is a problem that CRC properties may be deteriorated. In addition, if the conductivity of the brine is more than 55 mS/cm, the conductivity of the brine is too high, which may cause a damage to the degree of cross-linking of the super absorbent polymer, thereby deteriorating physical properties, especially CRC properties, of the super absorbent polymer.

Preferably, the conductivity of the brine may be 20 mS/cm or more, 25 mS/cm or more, 30 mS/cm or more, 35 mS/cm or more, or 40 mS/cm or more; and 54 mS/cm or less, 53 mS/cm or less, 52 mS/cm or less, or 51 mS/cm or less. Preferably, the conductivity of the brine may be 20 to 55 mS/cm, more preferably 40 to 55 mS/cm.

Meanwhile, the conductivity of the brine is measured at room temperature (25° C.) and atmospheric pressure (1 atm).

Preferably, the brine is an aqueous solution of $Na_2CO_3$, NaCl, or $Mg(CH_3COO)_2$, and the amount of the substance added is determined according to the conductivity described above.

Meanwhile, the treatment with the brine may be performed by spraying the brine on a surface of the super absorbent polymer particles prepared above. An amount of the brine treated may be 0.1 to 10 wt % based on the super absorbent polymer particles, preferably 0.5 to 5 wt %, or 0.5 to 1.5 wt %.

Meanwhile, the Step 4 is preferably performed at 10 to 30° C., and more preferably at room temperature (23° C.). In addition, the brine is sprayed onto the surface of the super absorbent polymer prepared in Step 3, wherein the temperature of the super absorbent polymer surface is about 70 to 100° C. Therefore, the super absorbent polymer is naturally cooled, and it is preferable to leave it for 15 to 30 minutes from the time when the brine is sprayed.

(Super Absorbent Polymer)

The super absorbent polymer prepared according to the above-described preparation method may be prevented from agglomeration upon absorption of moisture, as fine particles are removed therefrom. In addition, the inherent physical properties of the super absorbent polymer may be maintained without being impaired during the water absorption process.

Specifically, the super absorbent polymer according to the present disclosure contains a cross-linked polymer in which a water-soluble ethylene-based unsaturated monomer having at least partially neutralized acidic groups is polymerized in the presence of an internal cross-linking agent, and the cross-linked polymer includes a surface cross-linked layer modified by a surface cross-linking agent; wherein coarse particles are generated up to 2 wt %.

Preferably, the super absorbent polymer according to the present disclosure has CRC (Centrifugal Retention Capacity) of 27.5 g/g or more, more preferably 27.6 g/g or more, 27.7 g/g or more, 27.8 g/g or more, 27.9 g/g or more, or 28.0 g/g or more. In addition, since the higher CRC value can be evaluated as the better, the upper limit thereof is theoretically not limited. For example, it may be 30.0 g/g or less.

Meanwhile, a specific measurement method of CRC is described in detail in the following Examples.

Preferably, the super absorbent polymer according to the present disclosure has AAP (Absorption Against Pressure; 0.7 psi condition) of 24.0 g/g or more, more preferably 24.1 g/g or more, 24.2 g/g or more, 24.3 g/g or more, 24.4 g/g or more, or 24.5 g/g or more. In addition, since the higher AAP value can be evaluated as the better, the upper limit thereof is theoretically not limited. For example, it may be 28.0 g/g or less. Meanwhile, a specific measurement method of AAP is described in detail in the following Examples.

Preferably, the super absorbent polymer according to the present disclosure has a permeability of 30 mL or more, more preferably 31 mL or more, 32 mL or more, 33 mL or more, 34 mL or more, or 35 mL or more; and 50 mL or less, 49 mL or less, 48 mL or less, 47 mL or less, 46 mL or less, or 45 mL or less. Meanwhile, a specific measurement method of the permeability is described in detail in the following Examples.

Preferably, the super absorbent polymer according to the present disclosure has a vortex (absorption rate) of 70 seconds or less, more preferably 65 seconds or less, 64 seconds or less, 63 seconds or less, 62 seconds or less, 61 seconds or less, or 60 seconds or less. In addition, since the smaller vortex value can be evaluated as the better, the lower limit thereof may be 40 seconds or more, 45 seconds or more, or 50 seconds or more. Meanwhile, a specific measurement method of the vortex is described in detail in the following Examples.

Advantageous Effects

According to the method for preparation of a super absorbent polymer of the present disclosure, fine particles present in the prepared super absorbent polymer are removed, thereby solving a dispersion problem of fine particles and a problem of reduction in physical properties of the super absorbent polymer.

DETAILED DESCRIPTION OF THE EMBODIMENTS

Hereinafter, the function and effect of the present invention will be described in more detail through specific examples. However, these examples are for illustrative purposes only, and the invention is not intended to be limited by these examples.

Example 1

As a manufacturing device for a super absorbent polymer, a continuous manufacturing device including a polymerization process, a hydrogel pulverizing process, a drying process, a pulverizing process, a classification process, a surface cross-linking process, a cooling process, a classification process, and a transport process connecting each process was used.

(Step 1)

A monomer solution was prepared by mixing 0.4 parts by weight of polyethylene glycol diacrylate (weight average molecular weight: ~500 g/mol) as an internal cross-linking agent, 0.1 parts by weight of hexanediol diacrylate, and 0.01 parts by weight of IRGACURE 819 as a photoinitiator with 100 parts by weight of acrylic acid. Subsequently, while continuously supplying the monomer solution to a metering pump, 160 parts by weight of a 24 wt % sodium hydroxide aqueous solution was continuously line-mixed to prepare a monomer aqueous solution. At this time, after confirming that the temperature of the monomer aqueous solution had risen to about 72° C. or higher by the heat of neutralization, the solution was allowed to stand until the temperature was cooled to 40° C.

When cooled down to the temperature of 40° C., 6 parts by weight of solid sodium bicarbonate and 6 parts by weight of a 2 wt % aqueous sodium persulfate solution were added to the monomer aqueous solution.

The solution was poured into a Vat-type tray (tray, 15 cm wide×15 cm long) installed in a square polymerizer, wherein the polymerizer was provided with a light irradiation device on the top and preheated to 80° C., and then light irradiation was performed to initiate photopolymerization. It was confirmed that a gel was generated from the surface about 25 seconds after the light irradiation and a polymerization reaction occurred simultaneously with foaming after about 50 seconds, and the reaction was further performed for 3 minutes to obtain a sheet-shaped hydrogel polymer.
(Step 2)

The hydrogel polymer prepared in Step 1 was cut into a size of 3 cm×3 cm, and then pulverized (chopped) while pushing the hydrogel polymer into a porous plate having a plurality of holes using a screw-type extruder installed inside a cylindrical pulverizing machine.

Subsequently, the pulverized hydrogel polymer was dried in a dryer capable of changing wind direction up and down. The hydrogel polymer was uniformly dried by flowing hot air at 180° C. from the bottom to the top for 15 minutes, and then flowing from the top to the bottom for 15 minutes, so that the moisture content of the dried powder was less than about 2%.

The dried polymer was pulverized with a pulverizing machine, and then classified to obtain a base resin powder having a size of 150 to 850 um.
(Step 3)

100 parts by weight of the base resin prepared in Step 2 was mixed with a cross-linking agent solution in which 3 parts by weight of water, 3 parts by weight of methanol, and 0.5 parts by weight of ethylene carbonate were mixed, followed by surface cross-linking reaction at 180° C. for 40 minutes.
(Step 4)

After cooling the resulting product obtained in Step 3 to 90° C., 1 parts by weight of brine ($Na_2CO_3$ 5% aqueous solution) based on 100 parts by weight of the resulting product was added using a dropper. Thereafter, while maintaining stirring, additional stirring/cooling was performed for 15 to 25 minutes to obtain surface cross-linked super absorbent polymer particles having a particle diameter of 150 to 850 um. The temperature of the finally obtained super absorbent polymer particles was 40° C.

Example 2

A super absorbent polymer was prepared in the same manner as in Example 1, except that NaCl 2% aqueous solution was used instead of $Na_2CO_3$ 5% aqueous solution in Step 4 of Example 1.

Example 3

A super absorbent polymer was prepared in the same manner as in Example 1, except that $Mg(CH_3COO)_2$ 5% aqueous solution was used instead of $Na_2CO_3$ 5% aqueous solution in Step 4 of Example 1.

Comparative Example 1

A super absorbent polymer was prepared in the same manner as in Example 1, except that Step 4 of Example 1 was omitted.

Comparative Example 2

A super absorbent polymer was prepared in the same manner as in Example 1, except that distilled water was used instead of $Na_2CO_3$ 5% aqueous solution in Step 4 of Example 1.

Comparative Example 3

A super absorbent polymer was prepared in the same manner as in Example 1, except that NaCl 0.5% aqueous solution was used instead of $Na_2CO_3$ 5% aqueous solution in Step 4 of Example 1.

Comparative Example 4

A super absorbent polymer was prepared in the same manner as in Example 1, except that $Na_2CO_3$ 10% aqueous solution was used instead of $Na_2CO_3$ 5% aqueous solution in Step 4 of Example 1.

EXPERIMENTAL EXAMPLES

Physical properties of the prepared super absorbent polymer were measured according to the following method.
(1) Dust View 30 g of each of the super absorbent polymers prepared in Examples and Comparative Examples was prepared, and dust values were measured and analyzed using Dustview II (manufactured by Palas GmbH), which can measure the degree of dust of the super absorbent polymer with a laser. Since small particles and specific substances fall at a slower rate than coarse particles, dust number was calculated according to Equation 1 below.

$$\text{Dust number} = \text{Max value} + 30 \text{ sec. value} \quad \text{[Equation 1]}$$

(In Equation 1, Max value represents a maximum dust value, and 30 sec. value is a value measured 30 seconds after reaching the maximum dust value)
(2) Proportion of Coarse Particles Generated The super absorbent polymer particles prepared in one of Examples and Comparative Examples were classified using a 710 um mesh (manufacturer: Retsch) for 10 minutes under the condition of Amp. 1.0 mm, and then a proportion (weight ratio) of the residue on the mesh was calculated.
(3) CRC (Centrifugal Retention Capacity)

The centrifuge retention capacity by absorption ratio under a non-loading condition of each polymer was measured in accordance with EDANA WSP 241.3.

Specifically, a polymer was obtained by classifying each of the polymers prepared in Examples and Comparative Examples through a sieve of #30-50. After inserting $W_0$ (g, about 0.2 g) of the polymer uniformly in a nonwoven fabric envelope and sealing the same, it was soaked in physiological saline (0.9 wt %) at room temperature. After 30 minutes, the envelope was centrifuged at 250 G for 3 minutes to drain, and the weight $W_2$ (g) of the envelope was measured. Further, after carrying out the same operation without using the polymer, the weight $W_1$ (g) of the envelope was measured. Then, CRC (g/g) was calculated by using the obtained weight values according to the following Equation.

$$CRC\ (g/g) = \{[W_2(g) - W_1(g)]/W_0(g)\} - 1 \quad \text{[Equation 4]}$$

(4) AAP (Absorption Against Pressure)

The absorption against pressure at 0.7 psi of each polymer was measured in accordance with EDANA WSP 242.3. In the measurement of the absorption against pressure, the classified polymer in the above CRC measurement was used.

Specifically, a 400 mesh stainless steel screen was installed in a cylindrical bottom of a plastic having an inner diameter of 25 mm. $W_0$ (g, 0.16 g) of the super absorbent polymer was uniformly scattered on the screen at room temperature and a humidity of 50%. Thereafter, a piston which can uniformly provide a load of 0.7 psi was placed thereon. Herein, the outer diameter of the piston was slightly smaller than 25 mm, there was no gap with the inner wall of the cylinder, and jig-jog of the cylinder was not interrupted. At this time, the weight $W_3$ (g) of the device was measured. Subsequently, a glass filter having a diameter of 90 mm and a thickness of 5 mm was placed in a petri dish having a diameter of 150 mm, and physiological saline (0.9 wt % sodium chloride) was poured in the dish. At this time, the physiological saline was poured until the surface level of the physiological saline became equal to the upper surface of the glass filter. One sheet of filter paper with a diameter of 90 mm was placed thereon. After the measuring device was placed on the filter paper, the liquid was absorbed for 1 hour under a load. After 1 hour, the measuring device was lifted, and the weight $W_4$ (g) was measured. Then, absorption against pressure (g/g) was calculated by using the obtained weight values according to the following Equation.

$$AAP\ (g/g) = [W_4(g) - W_3(g)]/W_0(g) \quad \text{[Equation 2]}$$

(5) Permeability (Perm)

Permeability of the super absorbent polymer prepared in one of Examples and Comparative Examples was measured according to the following Equation 3.

$$Perm = [20\ \text{mL}/T_1\ (\text{sec})] * 60\ \text{sec} \quad \text{[Equation 3]}$$

in Equation 3,

Perm is a permeability of the super absorbent polymer, and $T_1$ is the time (in seconds) taken for 20 mL of physiological saline to pass through the swollen super absorbent polymer under a pressure of 0.3 psi, after adding 0.2 g of the super absorbent polymer in a cylinder and then pouring physiological saline (0.9 wt % sodium chloride aqueous solution) thereto so that the super absorbent polymer is completely immersed to be swollen for 30 minutes.

Specifically, a cylinder and a piston were prepared. As the cylinder, a cylinder having an inner diameter of 20 mm equipped with a glass filter and a stopcock at the bottom was used. A piston including a screen having an outer diameter slightly smaller than 20 mm and capable of freely moving the cylinder up and down at the bottom, a weight at the top, and a rod connecting the screen and the weight was used. The piston was equipped with a weight capable of applying a pressure of 0.3 psi by the addition of the piston.

With the stopcock of the cylinder closed, 0.2 g of the super absorbent polymer was added, and an excess of physiological saline (0.9 wt % sodium chloride aqueous solution) was poured so that the super absorbent polymer was completely immersed. Then, the super absorbent polymer was swollen for 30 minutes. Thereafter, a piston was added to uniformly apply a load of 0.3 psi on the swollen super absorbent polymer.

Subsequently, the time taken for 20 mL of physiological saline to pass through the swollen super absorbent polymer was measured in seconds by opening the stopcock of the cylinder. At this time, the meniscus when the cylinder was filled with 40 mL of physiological saline, and the meniscus when the cylinder was filled with 20 mL of physiological saline were marked. Then, the time taken to reach the level corresponding to 20 ml from the level corresponding to 40 mL was measured to easily measure the T1 of the above Equation 3.

(6) Vortex (Absorption Rate by Vortex Method)

The absorption rate of the super absorbent polymer prepared in one of Examples and Comparative Examples was measured in seconds according to the method disclosed in International Patent Publication No. 1987-003208.

Specifically, the absorption rate was calculated by adding 2 g of the super absorbent polymer to 50 mL of physiological saline at 23° C. to 24° C., stirring a magnetic bar (8 mm in diameter and 31.8 mm in length) at 600 rpm, and measuring the time taken until vortex disappeared in seconds.

The measurement results are summarized in Table 1 below.

TABLE 1

|  | Unit | Ex. 1 | Ex. 2 | Ex. 3 | Comp. Ex. 1 | Comp. Ex. 2 | Comp. Ex. 3 | Comp. Ex. 4 |
|---|---|---|---|---|---|---|---|---|
| Materials used |  | $Na_2CO_3$ 5% | NaCl 2% | $Mg(CH_3COO)_2$ 5% | — | $H_2O$ | NaCl 0.5% | $Na_2CO_3$ 10% |
| Conductivity | mS/cm | 50.5 | 30.5 | 20.5 | — | 0 | 10.0 | 83.6 |
| Amount treated | wt % based on SAP | 1.0 | 1.0 | 1.0 | — | 1.0 | 1.0 | 1.0 |
| Moisture content | wt % | 0.95 | 0.89 | 0.90 | 0.25 | 0.92 | 0.91 | 0.92 |
| Dust view | — | 0.4 | 0.5 | 0.6 | 1.5 | 0.5 | 0.5 | 0.4 |
| Proportion of coarse particles generated | % | 1.0 | 1.3 | 1.7 | 0 | 3.5 | 2.6 | 1.2 |
| CRC | g/g | 28.1 | 28.2 | 28.0 | 28.2 | 27.4 | 27.7 | 27.3 |
| AAP | g/g | 24.7 | 24.5 | 24.6 | 24.6 | 24.6 | 24.4 | 24.1 |
| CRC + AAP | g/g | 52.8 | 52.7 | 52.6 | 52.8 | 52.0 | 52.1 | 51.4 |

TABLE 1-continued

|  | Unit | Ex. 1 | Ex. 2 | Ex. 3 | Comp. Ex. 1 | Comp. Ex. 2 | Comp. Ex. 3 | Comp. Ex. 4 |
|---|---|---|---|---|---|---|---|---|
| Permeability | mL | 41 | 40 | 39 | 38 | 40 | 37 | 42 |
| Vortex | sec | 44 | 42 | 41 | 43 | 45 | 44 | 42 |

As shown in Table 1, it was confirmed that Examples 1 to 3 treated with brine having a conductivity according to the present disclosure had lower dust view compared to Comparative Example 1 without the treatment with brine, while maintaining inherent physical properties of the super absorbent polymer. This is due to the fact that fine particles were removed without affecting the inherent physical properties of the super absorbent polymer by performing the treatment with brine.

On the other hand, when the conductivity of the brine was small as in Comparative Examples 2 and 3, the dust view could be improved, but the generation of coarse particles increased, so that CRC properties were particularly deteriorated.

In addition, when the conductivity of the brine was high as in Comparative Example 4, it can be seen that CRC properties were deteriorated even though the proportion of coarse particles generated was similar to that of Examples according to the present disclosure. This is due to the fact that the brine having high conductivity damaged the degree of cross-linking of the super absorbent polymer, resulting in deterioration of CRC properties.

What is claimed is:

1. A method for preparation of a super absorbent polymer, comprising:
   1) Forming a hydrogel polymer containing a first cross-linked polymer by cross-linking polymerization of a water-soluble ethylene-based unsaturated monomer having at least partially neutralized acidic groups in the presence of an internal cross-linking agent;
   2) Drying, pulverizing and classifying the hydrogel polymer to form a base resin powder; and
   3) cross-linking a surface by heat-treating the base resin powder in the presence of a surface cross-linking solution to form super absorbent polymer particles; and
   4) Adding brine to the super absorbent polymer particles to remove fine particles having a particle diameter of 150 μm or less present in the super absorbent polymer, wherein a conductivity of the brine is 15 to 55 mS/cm, wherein the brine is an aqueous solution of $Na_2CO_3$, NaCl, or $Mg(CH_3COO)_2$,
   wherein an amount of the brine is 0.1 to 10 wt % based on the super absorbent polymer particles,
   wherein about 50% or more of the fine particles contained in the super absorbent polymer are removed.

2. The method for preparation of a super absorbent polymer of claim 1,
   wherein the water-soluble ethylene-based unsaturated monomer is a compound represented by the following Chemical Formula 1, $R_1\text{-COOM}_1$  [Chemical Formula 1]

in Chemical Formula 1,
   $R_1$ is a $C_2$ to $C_5$ alkyl group having an unsaturated bond, and
   $M_1$ is a hydrogen atom, a monovalent or divalent metal, an ammonium group, or an organic amine salt.

3. The method for preparation of a super absorbent polymer of claim 1,
   wherein the internal cross-linking agent comprises at least one of N,N'-methylenebisacrylamide, trimethylolpropane tri(meth)acrylate, ethylene glycol di(meth)acrylate, polyethylene glycol di(meth)acrylate, propylene glycol di(meth)acrylate, polypropylene glycol di(meth)acrylate, butanediol di(meth)acrylate, butylene glycol di(meth)acrylate, diethylene glycol di(meth)acrylate, hexanediol di(meth)acrylate, triethylene glycol di(meth)acrylate, tripropylene glycol di(meth)acrylate, tetraethylene glycol di(meth)acrylate, dipentaerythritol pentaacrylate, glycerin tri(meth)acrylate, pentaerythritol tetraacrylate, triarylamine, ethylene glycol diglycidyl ether, propylene glycol, glycerin, or ethylene carbonate.

4. The method for preparation of a super absorbent polymer of claim 1,
   wherein the cross-linking 3) is performed at 180 to 250° C.

5. The method for preparation of a super absorbent polymer of claim 1,
   wherein the conductivity of the brine is 20 to 55 mS/cm.

* * * * *